(12) United States Patent
Lindig et al.

(10) Patent No.: US 8,806,899 B2
(45) Date of Patent: Aug. 19, 2014

(54) MELTING DEVICE FOR PRODUCING A GLASS MELT

(75) Inventors: Matthias Lindig, Ingelheim (DE); Helmut Sorg, Glattbach (DE); Alexander Sorg, Aschaffenburg (DE)

(73) Assignee: Beteiligungen Sorg GmbH & Co. KG, Lohr am Main (DE)

( * ) Notice: Subject to any disclaimer, the term of this patent is extended or adjusted under 35 U.S.C. 154(b) by 83 days.

(21) Appl. No.: 13/147,277

(22) PCT Filed: Jan. 22, 2010

(86) PCT No.: PCT/EP2010/000364
§ 371 (c)(1),
(2), (4) Date: Oct. 10, 2011

(87) PCT Pub. No.: WO2010/086121
PCT Pub. Date: Aug. 5, 2010

(65) Prior Publication Data
US 2012/0017643 A1   Jan. 26, 2012

(30) Foreign Application Priority Data
Jan. 31, 2009 (DE) .................. 10 2009 006 958

(51) Int. Cl.
C03B 5/20 (2006.01)
C03B 5/225 (2006.01)
C03B 5/23 (2006.01)

(52) U.S. Cl.
CPC .............. C03B 5/2257 (2013.01); C03B 5/20 (2013.01); C03B 5/23 (2013.01)
USPC .......................................... 65/346; 65/135.1

(58) Field of Classification Search
CPC ........ C03B 5/20; C03B 5/225; C03B 5/2257; C03B 5/23; C03B 5/04
USPC .............................................. 65/134.1, 135.1
See application file for complete search history.

(56) References Cited

U.S. PATENT DOCUMENTS

| | | | |
|---|---|---|---|
| 1,941,778 A * | 1/1934 | Amsler ................... | 65/136.3 |
| 2,203,269 A * | 6/1940 | Mulholland .............. | 65/135.2 |
| 3,261,677 A | 7/1966 | Plumat | |
| 3,776,710 A * | 12/1973 | Knavish et al. ......... | 65/136.2 |
| 3,884,665 A | 5/1975 | Edge et al. | |
| 3,928,014 A | 12/1975 | Knavish | |
| 3,989,497 A * | 11/1976 | Dickinson et al. ...... | 65/135.3 |
| 4,046,546 A | 9/1977 | Hynd | |
| 4,200,448 A * | 4/1980 | Dickinson ............... | 65/135.3 |
| 4,764,198 A * | 8/1988 | Lythgoe .................. | 65/339 |
| 4,798,616 A * | 1/1989 | Knavish et al. ......... | 65/135.8 |
| 5,194,081 A | 3/1993 | Trevelyan et al. | |
| 5,766,296 A | 6/1998 | Moreau | |
| 2004/0099009 A1* | 5/2004 | Linz et al. .............. | 65/135.1 |

* cited by examiner

Primary Examiner — Matthew Daniels
Assistant Examiner — Cynthia Szewczyk
(74) Attorney, Agent, or Firm — Greer, Burns & Crain Ltd.

(57) ABSTRACT

A glass melting oven for producing a glass melt in a row arrangement, having a loading opening for raw glass materials, a melting region, a refining region, a constriction, a conditioning region and an overflow into a processing unit. To remove flaws from the melt that remain visible in the end product, a method includes the steps of a) arranging a refining bench between the melting region and the beginning of the refining region; b) arranging side burners and extraction openings for flue gases between the loading opening and the refining bench; c) delimiting the constriction at both ends by end walls that leave narrow flow cross-sections above the glass melt for flue gases; and d) cooling the glass melt inside the constriction. The glass melting oven is particularly suited for producing flat glass and panels for solar elements. The oxidants for the fuels may also be preheated.

17 Claims, 4 Drawing Sheets

MELTING DEVICE FOR PRODUCING A GLASS MELT

BACKGROUND OF THE INVENTION

The present invention relates to a melting device for producing a glass melt, having a row arrangement of at least one loading opening for glass raw materials, a melting region, a refining region, a constriction, a conditioning region, and an overflow for conducting the glass melt to a processing unit, the row arrangement having floor surfaces, side walls, and cover surfaces.

The technology of glass production is very complex. It is based on principles of physics, chemistry, thermodynamics, thermokinetics, statics, and the geometry of the melt container, as well as, not least, legal regulations that protect humans and the environment against harmful substances and that regulate energy efficiency and pricing. As a rule, the production methods are based on temperatures exceeding 1500° C., corresponding to white heat. Here it is important that the components and parameters must be evaluated in their complex interactions with one another, and often affect one another in disputed ways.

These considerations are also be taken into account from the point of view of the manufacturers of glass products such as household glass and containers such as drinking glasses and bottles, as well as flat glass, and from the point of view of the manufacturers of glass melting installations, which are parts of complicated factories having a large number of peripheral devices and buildings, and are not simply tubs such as a bathtub. This is all the more important due to the fact that glass melting installations are long-term investments that have to be maintained and repaired as needed.

Particularly tricky in this context are container glasses such as drinking glasses, bottles, and other dishware, as well as, in particular, large flat or float glass products, because these are products in which flaws such as clouding by small particles, gas bubbles, streaks, tints and color deviations due to combustion products, as well as variations in thickness, remain permanently visible in the glass. In the case of flat glass used in the manufacture of solar elements, further problems result: because the flat glass here is used as a substrate and must be highly transparent to light, the glass must be substantially free of absorbing components such as e.g. iron oxide. The present invention is concerned with the solution, to at least a great extent, of such problems.

From U.S. Pat. No. 3,884,665 A, in a melt oven for manufacturing flat glass it is known to provide a first constriction between the melting region, equipped with lateral burners, and the refining region, which does not have burners, in the chamber filled with the combustion gas above the loading material and the melt, without however thereby hindering the melt. Between the refining region and the region for cooling the melt to form a glass ribbon, a further constriction is provided that has a floor threshold and whose flow cross-section in the vertical direction can be adjusted by a movable element situated over the floor threshold. The maximum temperature of the glass melt can lie below the first constriction of the gas chamber, because the description contains the indication that the melt in the refining region is cooled to a suitably high viscosity. The floor threshold here is not a refining bench, because it lacks a sufficiently large horizontal surface in the flow direction to provide a corresponding sojourn time of the melt. The sojourn time is in fact particularly short due to the cylindrical curvature and the narrow horizontal gap between the threshold and the lower edge of the movable element.

From U.S. Pat. No. 3,928,014 A, during the manufacture of flat glass it is known to thermally produce two flows within the melt in a cuboidal tub volume. For this purpose, in the roof of the oven and transverse to the direction of flow a plurality, e.g. eight, groups of burners are situated between the loading opening and the take-off opening; these groups can be set to different power levels by modifying the supply of combustion gas. The highest temperature range here produces a strong forward flow and is therefore also called the "spring zone." This spring zone not only divides, purely functionally and hydraulically, the oven chamber into a melting region and a refining region, but also so separates the flow directions on the surface and over the floor of the tub. The surface flows are directed away from one another, while the floor flows are directed toward one another, and a part of the floor flow of the stream in the refining region is remixed with the surface flow in the melting region in the direction toward the loading material. Shifting the spring zone in the direction toward the flat glass tub, by shifting the specific heat power of the burner group according to curve B in FIG. 3, achieves a lengthening of the flow path before the spring zone. This is intended to achieve a prolongation of the sojourn time and thus an improvement of the glass quality. The length ratio of the melting region to the refining region is here indicated as preferably between 1.25:1 and 1.50:1. However, this measure is realized at the expense of the length of the refining region, so that significant problems remain. A refining bench is also not disclosed in this document.

From U.S. Pat. No. 5,766,296 A, and the corresponding EP 0 763 503 B1, it is known to force a separation between a melting region and a refining region, and between the flows taking place therein, by using a floor threshold, and to reinforce the separating effect thereof by using rows of floor electrodes at both sides and a row of bubbler nozzles situated before said electrodes. However, the floor threshold does not have the effect of a refining bench, because its height in the glass bath should be limited to a maximum of 50% of the filling level at both sides, and its cross-section should taper strongly upwards, so that the flows are hindered as little as possible. Between the refining region and a homogenization region, immediately behind a step there is situated a constriction, which is referred to as a neck or waist, but which does not have any installed components inside the melt.

From U.S. Pat. No. 5,194,081, it is known to use floor electrodes to heat a melting region for glass raw materials and a riser chamber for the melt. A raised part of the floor, called a weir, is situated between the riser chamber and the conditioning region, and its outer side walls are exposed to air in order to cool the melt. This document does not say anything about the distance of the upper side of the weir from the melt surface or the length in the flow direction of the glass, so that the raised part of the floor cannot, and is not intended to, act as a refining bench or to separate glass flows. To the extent that a heating by burners is disclosed (column 5, lines 18 through 27), these burners are situated in wall openings (ports) 40 and 41, and are therefore, according to standard definitions, cross-flow burners whose effect is limited to the cross-flow region situated between them. A longitudinal flow of combustion gases through the conditioning chamber is in this way also not possible. The flows in the glass are indicated by arrows, and it can be seen that above the weir and inside the riser chamber there occur counter-flows and turbulences that at least hinder refinement of the melt at this location. Indeed, in the same paragraph, in lines 18 through 21, it is expressly stated that the reduction of impurities and bubbles is supposed to take place after (!) the melt flows over weir 39. However, the bath depth after weir 39 is clearly opposed to this, so that weir 39 cannot be considered to be a refining bench.

BACKGROUND OF THE INVENTION

Therefore, the present invention is based on the object of improving a device of the type named above in such a manner that before being provided to a processing device the glass melt is freed as much as possible of flaws such as cloudiness due to mini-particles, gas bubbles, streaks, discoloration and color deviation due to combustion products, and variations in thickness that remain permanently visible in the glass.

According to the present invention, this object is achieved in that
(a) between the melting region and the beginning of the refining region, there is situated a refining bench whose upper side has a distance from a constructively prespecified filling level of the glass melt such that a back-flow of the glass melt from the refining region to the melting region is as small as possible,
(b) in each side wall, side burners and extraction openings for flue gases are situated between the at least one loading opening and the refining bench,
(c) the constriction is delimited at both ends by end walls that leave open narrow flow cross-sections for flue gases above the glass melt, and
(d) cooling means for the glass melt are situated inside the constriction.

Through the interaction of these means, the object of the invention is achieved reliably and economically in that the device of the type described above is improved such that before being supplied to a further processing device the glass melt is freed as much as possible of flaws such as cloudiness due to mini-particles, gas bubbles, streaks, discoloration and color deviation due to combustion products, and variations in thickness that remain permanently visible in the glass. Due to the refining bench and its blocking effect, back-flows into the melting region with strong heating, and the carrying along of disturbing effects, such as in particular particles, into the final product are prevented, and at the same time the energetic degree of efficiency is significantly improved, while protecting the environment.

The term "refining bench" was introduced by applicant several years ago because it indicates the geometry, spatial form, and relative position within the melt that a refining bench has. In the dictionary "ABC Glas" (Deutsche Verlag für Grundstoffundustrie, Leipzig, 1991), the terms "refining" and "refining zone" are explained on pages 165 and 166. According to page 165, what is concerned is a removal of bubbles by shortening the path of the bubble rise by causing a melt containing bubbles to flow slowly and horizontally in the take-off direction in a broad thin layer at a high temperature, e.g. over a floor wall installed in the melt. The shortening of the bubble rise path contributes here to the thermal refining effect. This principle ensures a strong refining effect (direct quotation). Similar statements can be found under the entry "refining zone" on page 166.

In further embodiments of the device, it is particularly advantageous if (either individually or in combination):
- the cooling means are situated in the constriction in height-adjustable fashion,
- the cooling means are made up of pipe segments whose axes are situated in meander-shaped fashion in a common vertical plane,
- agitating elements are situated after the cooling means in the direction of flow,
- (a) between the at least one loading opening and the first flue gas extraction openings, there are situated side burners for the heating and melting of the glass raw materials, and
- (b) between the first flue gas extraction openings and the second flue gas extraction openings, there are situated further side burners for the completion of the melting, and in addition
- (c) the refining region is kept free of burners,
    - in the conditioning region, flue gas extraction openings and burners are situated in a sequence such that the flue gases flow in the direction opposite to the surface flow of the glass melt,
    - the floor surfaces are delimited from one another by a step formation that is fashioned so as to rise in the direction toward the overflow, in particular if the step height in each case is between 5 and 30 cm,
    - the difference in height of the floor surfaces before and after the refining bench is between 10 and 30 cm,
    - the level of filling of the glass melt over the refining bench is between 0.2 and 0.5 m, preferably between 0.3 and 0.4 m,
    - the length of the refining bench in the direction of the sum flow of the glass melt is between 0.8 and 3.0 m, preferably between 1.0 and 2.5 m,
    - the width of the melting region and refining region is between 6.0 and 10.0 m,
    - the ratio of the tub lengths inside the melting region (2) and the refining region before and after the refining bench is between 2.4 and 3.0,
    - the width ratio of the refining region to the constriction is between 0.4 and 0.6,
    - at least one preheating device for preheating oxidants for the combustion of the fuels is situated before the melting region,
    - the at least one preheating device is made up of a regenerator block, and/or
    - the melting device is fashioned as a cross-flame oven, if a respective generator block is situated on each side of the melting region and is connected via burner ports to the chamber above the glass melt, and if under-port burners are situated under the burner ports and above the surface of the glass melt.

The present invention also relates to a method for producing a glass melt by means of a melting device having a loading opening for glass raw materials, the glass melt being conveyed to a final processing stage through a row arrangement of a melting region, a refining region, a constriction, a conditioning region, and an overflow.

In order to achieve the same object and the same advantages, such a method is characterized in that the glass melt
(a) is guided between the melting region and the refining region over a refining bench whose upper side has a distance from the filling level of the glass melt such that a back-flow of the glass melt from the refining region to the melting region is as small as possible,
(b) is heated between the at least one loading opening and the refining bench by side burners and associated extraction openings for flue gases,
(c) is cooled in the constriction by cooling means, and
(d) is heated in the conditioning region by burners and flue gas extraction openings that are situated in a sequence such that the flue gases flow in the direction opposite to the surface flow of the glass melt,
(e) the heat input dosage to the flow path of the glass melt being set such that the maximum temperature of the glass melt is reached above the refining bench.

In further embodiments of the method, it is particularly advantageous if (either individually or in combination):

the flow speed of the melt over the refining bench is set by cooling means that are situated in the constriction in height-adjustable fashion, the melt is agitated by agitating elements after the cooling means, in the direction of flow, the temperature profile of the glass melt from the melting region up to the overflow is set such that in the melting region, going out from the refining bench, a surface flow of the glass is brought about in the direction toward the loading opening, and in the refining region, in the constriction, and in the conditioning region a surface flow of the glass in the direction toward the overflow is brought about, a flow only in the direction toward the overflow being brought about above the refining bench, the flow cross-section of the glass melt is reduced between the melting region and the conditioning region, the reduction of the flow cross-section is carried out in stepped fashion, the oxidants for the combustion of the fuels are preheated, the preheating of the oxidants is carried out in regenerator blocks, the melting device is operated in a cross-flame method, and the oxidants are introduced from the regenerator blocks through burner ports into the melting region, and/or the fuels are supplied to burners situated underneath the burner ports, and the flames are directed into the gas chamber above the glass melt.

The use of the method and device are particularly advantageous for the production of flat glass and of panels for solar elements.

BRIEF DESCRIPTION OF THE DRAWINGS

In the following, two exemplary embodiments of the subject of the present invention and of its manner of operation, and further advantages, are explained in more detail on the basis of FIGS. 1 through 7.

DETAILED DESCRIPTION OF THE PREFERRED EMBODIMENTS

Figure 1:
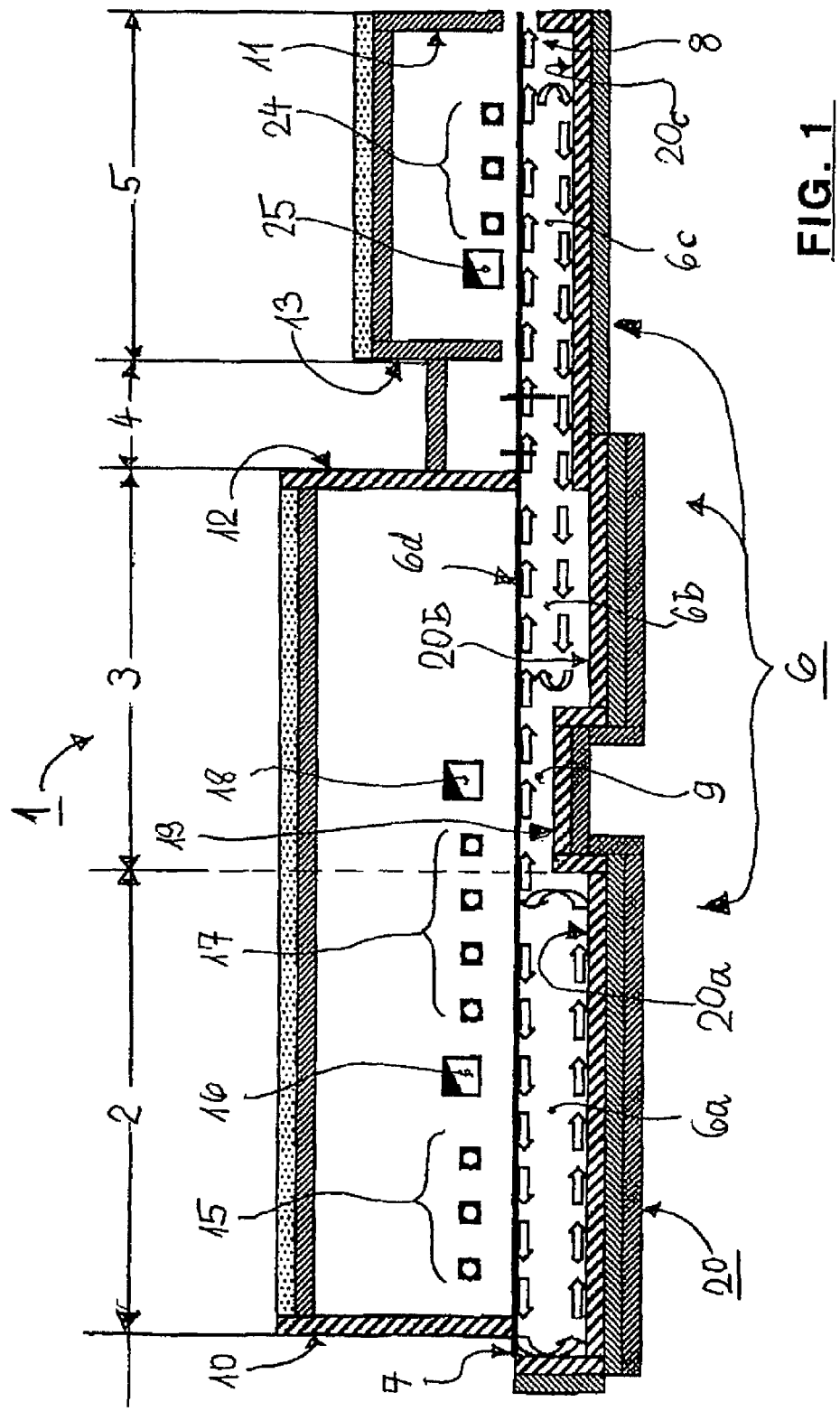
FIG. 1 shows a vertical longitudinal section through a first exemplary embodiment of a melting device.
Figure 2:
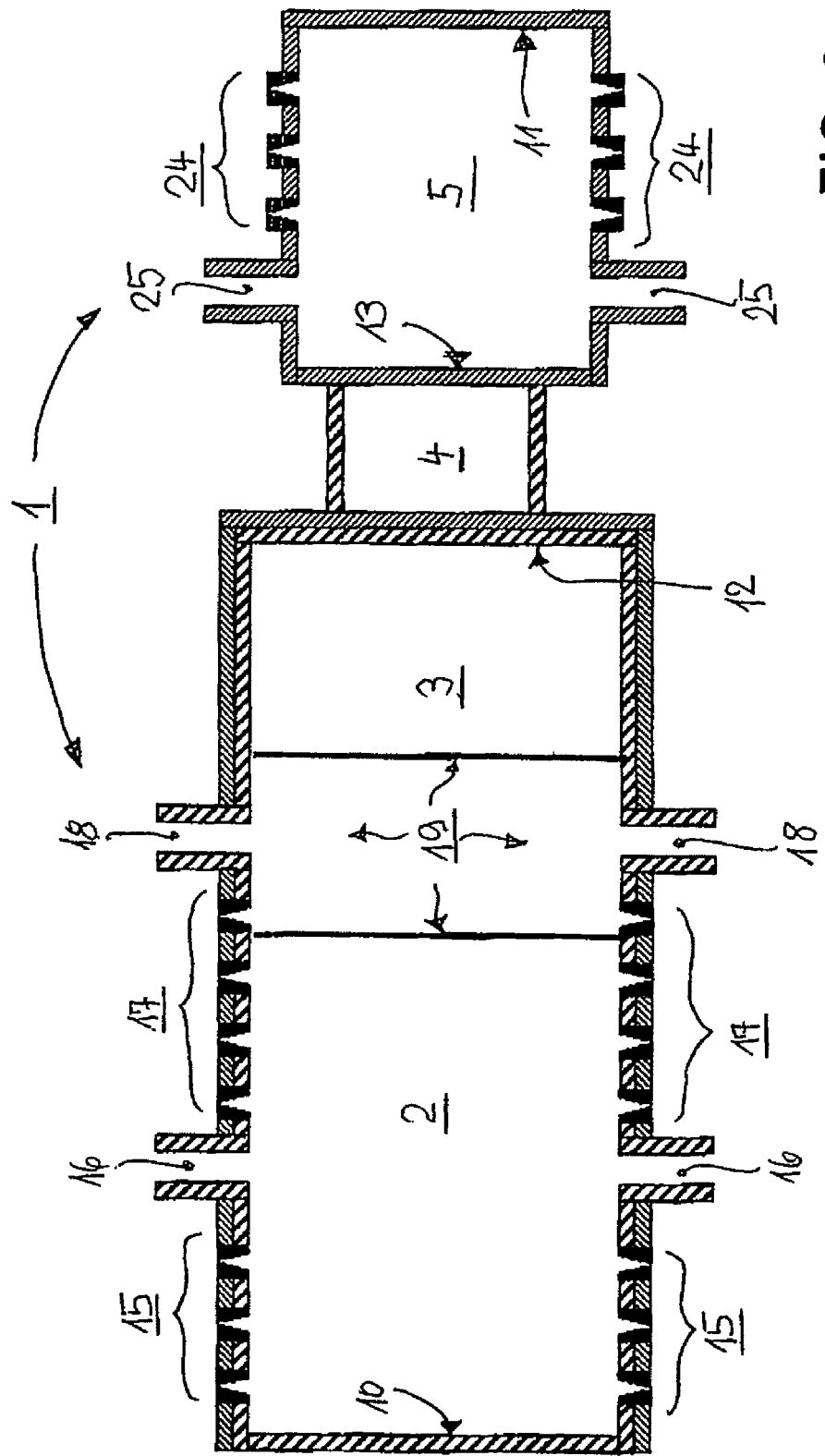
FIG. 2 shows a horizontal longitudinal section through the subject matter of FIG. 1 at the height of the burners and of the flue gas extraction openings.

FIGS. 1 and 2 show a melting device 1 that has, connected in series, a melting region 2, a refining region 3, a constriction 4, and a conditioning region 5. Tub lower part 6 is formed by corresponding tub regions 6a, 6b, and 6c, which lead from a loading opening 7 for the solid loading material to an overflow 8, and contain corresponding partial quantities of a glass melt 9. Above loading opening 7 there is situated a first end wall 10, and another end wall 11 is situated above overflow 8. Constriction 4 is situated between two further end walls 12 and 13 whose horizontal lower edges extend to just above melt surface 6d, so that a sufficient separation of the gas chambers above glass melt 9 is provided. Further observations below relate to the main direction of flow of the glass melt.

In melting region 2, in each of the two wall regions there is situated a respective first group of side burners 15 followed in each of the two wall regions by a respective flue gas extraction opening 16. This is the site of the greatest heat requirement, because here the loading material is preheated and is at least mostly melted. Each first group is followed by a respective second group of side burners 17, followed in each case by a flue gas extraction opening 18.

The following refining region 3 is free of burners and extraction openings, and has at its beginning refining bench 19, which is of decisive importance for the present invention and extends over the entire inner width of tub region 6b. Tub floor 20 is made in stepped fashion between floor surfaces 20a, 20b, and 20c. The filling level before refining bench 19 is 1.45 m, and in conditioning region 5 it is 1.15 m; here it is to be emphasized that these values are given only as examples. The filling level over refining bench 19 is usefully selected between 0.3 and 0.4 m; i.e. about 20 to 30%, from which it will be observed that refining bench 19 has a considerable height. The length of refining bench 19 in the direction of the sum flow is between 1.0 and 2.1 m, so that a sufficient sojourn time of the melt solely on refining bench 19 is provided. Here it is decisive that the cuboidal volume of the melt above refining bench 19 has a small height, but has a large length in the direction of flow in order to enable a thorough refining, due also to the sojourn time of the melt.

Figure 3:
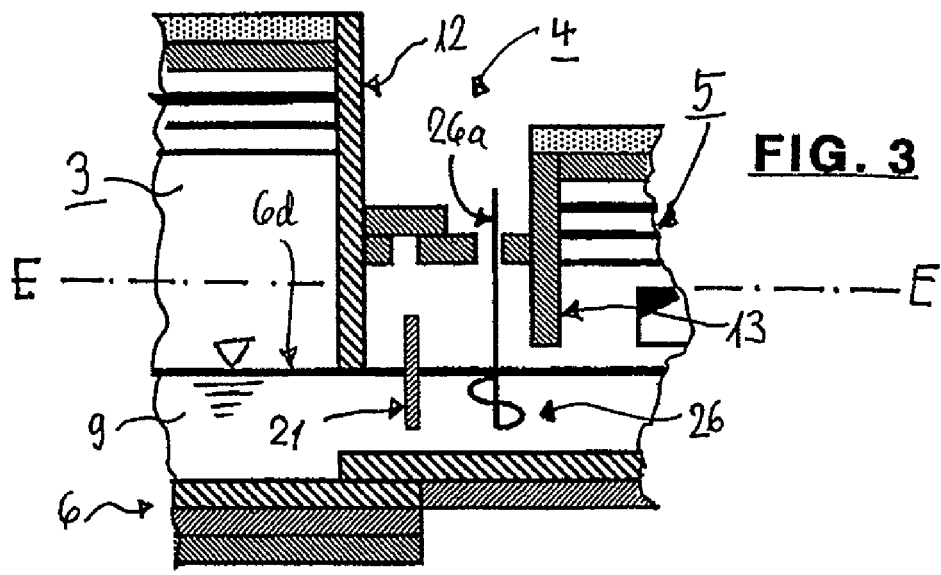
FIG. 3 shows a detail from FIG. 1 in an enlarged scale.
Figure 4:
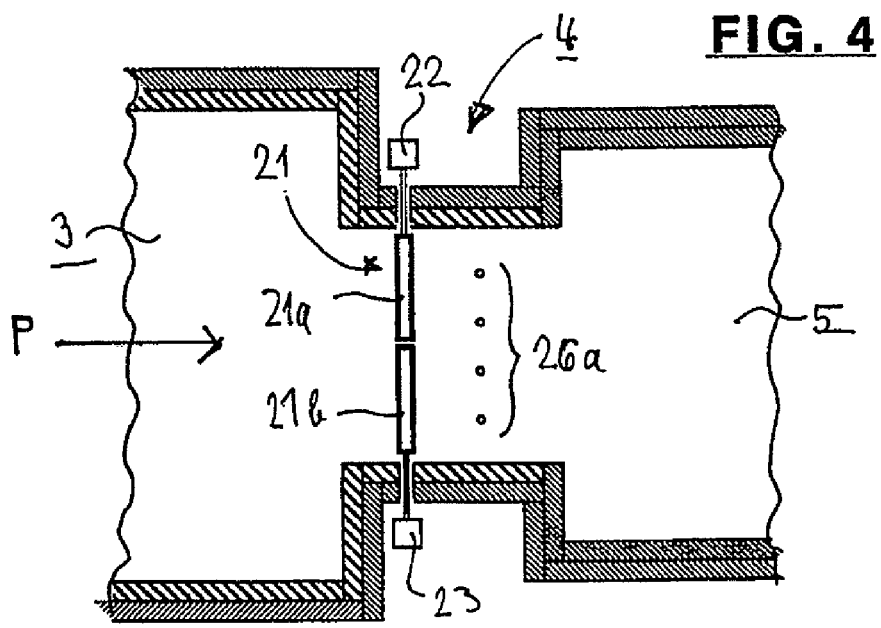
FIG. 4 shows a horizontal section through the subject matter of FIG. 3 along the plane E-E.
Figure 5:
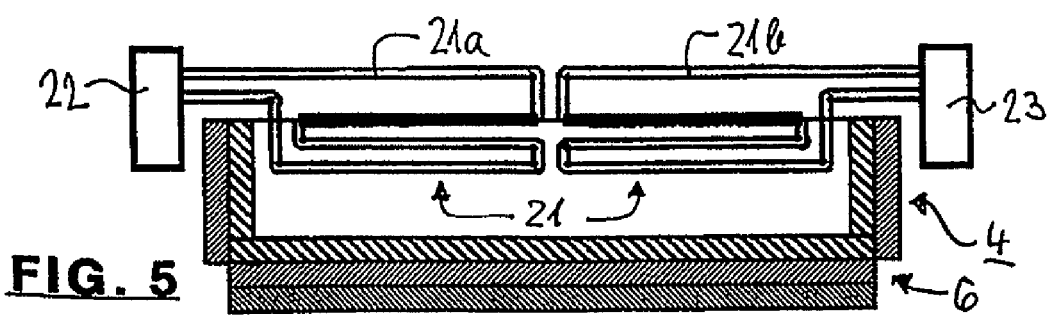
FIG. 5 shows a horizontal side view in the direction of arrow P in FIG. 4 in an enlarged scale.

According to FIGS. 3 through 5, in constriction 4 there is situated a cooling device 21 that is fastened in height-adjustable fashion to two vertical drives 22 and 23, and is made up of two meander-shaped pipe segments 21a and 21b, as can be seen in FIG. 5. The pipe axes lie in vertical planes, and vertical drives 22 and 23 are also water-cooled. According to FIGS. 3 and 4, in constriction 4 there is situated another series of pipe elements 26 that are fastened to vertical drive shafts 26a.

In conditioning region 5, at each of the two sides there is situated a respective group of burners 24 and a respective flue gas extraction opening 25 (see also FIG. 1). Another essential point of the operating method is that the highest temperature of the glass melt is reached above refining bench 19.

The advantageous effect of refining bench 19 is explained on the basis of the flow arrows in FIG. 1: stable flow conditions and controlled conditions for refining result from the formation of two flows, at both sides of refining bench 19. Due to a significantly smaller back-flow of cooler glass from conditioning region 5 into refining region 3, losses are reduced, because this glass stream would have to be reheated in the melting region or refining region, which would draw significant quantities of energy from the process. As shown, the glass flows in only one direction over refining bench 19. The quantity per time unit corresponds on average to the quantity of supplied loading material and the quantity of glass taken away through the overflow.

The second flow (to the right of refining bench 19) ensures that the glass leaving the first flow (to the left of refining bench 19) is conveyed to the surface. In this way, an emission of bubbles that are still disturbing the flow is provided. The second flow works as a kind of flow barrier against the first flow. The cooling power in conditioning region 5 is greater than the quantity of energy that must be drawn solely from the glass exiting melting device 1 via overflow 8. The characteristics of this second flow are influenced by process parameters such as throughput, but also by the immersion depth of cooling device 21, which is immersed in the region of constriction 4. The second flow is significantly less influenced by this. In contrast to the known barriers in the floor region having a lower height, refining bench 19 brings about an effective separation of the two flows. Therefore, in comparison with the prior art significantly lower quantities of energy are drawn from the melt via the second flow in the hot region in the melt tub.

The following is also to be noted concerning the significance of cooling device 21: its pipe segments 21a and 21b, depending on their immersion depth, prevent the direct flow of glass melt 9 into conditioning region 5. In the region near pipe segments 21a and 21b, the glass is strongly cooled, so that this glass does not participate in the flow, or does so only very slightly.

The vertical positioning of pipe segments 21a and 21b is one of the main ways of influencing the quantity of glass flowing back. If the immersion depth is small, a larger quantity of glass flows into conditioning region 5 than if the immersion depth is greater. Based on a constant take-off quantity per time unit from the installation, the quantity of recirculating glass is therefore increased in the first case and decreased in the second case. The quantity of glass that flows back into the melting region now essentially determines the position and the stability of the flow zone in which the recirculating glass quantity meets the glass flowing forward coming from loading opening 7.

In the prior art, on the one hand a stable flow state is achieved in that a glass quantity that is as large as possible is made to recirculate, while on the other hand the forward flow is also accelerated in the region from the reversal point to constriction 4. This region through which the glass flows is however critical for the quality of the glass that can be achieved. A short sojourn time in this region is synonymous with a poorer resolution of melt residuals and the degasification of the melt. This makes it clear that the setting and ensuring of the quality depends significantly on the skill and experience of the operating personnel when positioning such elements in constriction 4.

Refining bench 19 according to the present invention precisely achieves the advantageous effect in comparison with the prior art, and excludes uncertainty. The flows in the apparatus are significantly stabilized through the installation of refining bench 19. Model calculations and trials have shown that the position of the cooling device then has only a very small influence on the overall flow conditions.

Thus, in such an installation refining bench 19 brings significant advantages in two respects: the glass is forced to the surface by refining bench 19. This ensures that remaining gas bubbles are driven out. The length and coverage by glass of refining bench 19 is to be designed so that even the smallest gas bubbles can rise to the surface on refining bench 19.

Figure 6:
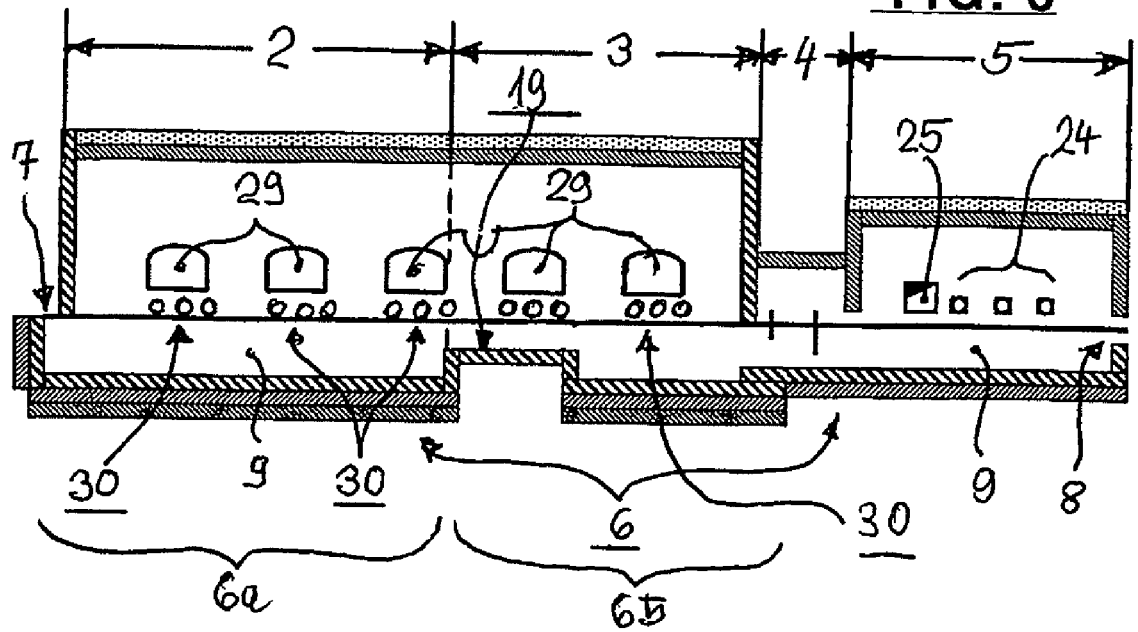
FIG. 6 shows a vertical longitudinal section through a second exemplary embodiment of a melting device having burner ports and under-port burners in a smaller scale.

FIG. 6 shows a vertical longitudinal section through the second exemplary embodiment of a melting device having regenerator blocks 27 and 28 at both sides of tub lower part 6, as well as burner ports 29 and what are known as under-port burners 30, in a smaller scale. The differences relate to the allocation of burner ports 29 and of under-port burners 30 to melting region 2 and to refining region 3, for which the previous reference characters have been retained.

Figure 7:
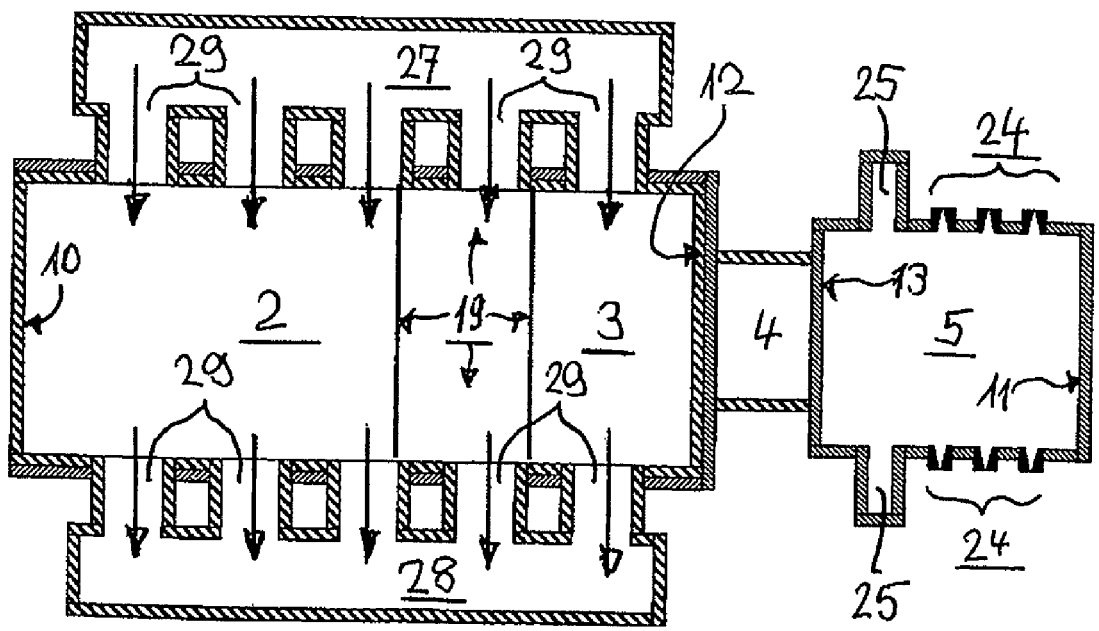
FIG. 7 shows a horizontal longitudinal section through the subject matter of FIG. 6 at the height of the burner ports.

From FIG. 7, which shows a horizontal longitudinal section through the subject matter of FIG. 6 at the height of burner ports 29, the following additionally follows: what is concerned is a so-called cross-flame tub operated in alternating fashion in changeover operation mode. In the one phase, the preheated combustion air flows from generator block 27 in the direction of the upper row of arrows into tub regions 6a and 6b, while at the same time through under-port burners 30 fuels and oxidants, in mixture if warranted, and/or air enriched with oxygen are supplied for combustion, requiring special burner designs which are however known to those skilled in the art. At the same time, the combustion or exhaust gases flow in the direction of the lower row of arrows into generator block 28. The directions of flow are reversed with a particular frequency, with which under-port burners 30 at both sides are also activated in alternating fashion. This manner of operation is also known to those skilled in the art, so that further explanation thereof is not required.

However, according to the present invention the presence of the above-described refining bench 19 between melting region 2 and the beginning of refining region 3 here plays an essential role, in interaction with the inner design and function of constriction 4, as described above and presented in FIGS. 3 through 5. FIGS. 6 and 7 are therefore also to be evaluated in a combined view with FIGS. 3 through 5. In the case of FIGS. 6 and 7, the number of burner ports 29 before refining bench 19 is greater than the number of such ports after refining bench 19.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

LIST OF REFERENCE CHARACTERS 1 melting device
2 melting region
3 refining region
4 constriction
5 conditioning region
6 tub lower part
6a tub region
6b tub region
6c tub region
6d melt surface
7 loading opening
8 overflow
9 glass melt
10 end wall
11 end wall
12 end wall
13 end wall
15 side burner
16 flue gas extraction opening
17 side burner
18 flue gas extraction opening
19 refining bench
20 tub floor
20a floor surface
20b floor surface
20c floor surface
21 cooling device
21a pipe segment
21b pipe segment
22 vertical drive
23 vertical drive
24 burner
25 flue gas extraction opening
26 agitating elements
26a drive shafts 27 regenerator block
28 regenerator block
29 burner ports
30 under-port burner

The invention claimed is:

1. A melting device for producing a glass melt having a row arrangement of at least one loading opening for glass raw materials, a melting region, a refining region, a constriction, a conditioning region, and an overflow for conducting the glass melt to a processing device, the row arrangement having end walls floor surfaces, side walls, and roof surfaces, with a first of the end walls having a lower end defining a melt surface level and a second of the end walls having a lower end defining a top of the overflow, comprising:
   a) between the melting region and the beginning of the refining region there is situated a refining bench whose upper side has a distance from the defined melt surface level such that a back-flow of the glass melt from the refining region to the melting region is reduced,
   b) in each side wall, side burners and extraction openings for flue gases are situated between the at least one loading opening and the refining bench,
   c) the constriction is delimited at both ends by end walls having horizontal lower edges positioned lust above the melt surface level, and no higher than the lower end of the second of the end walls, that leave open narrow flow cross-sections for flue gases above the glass melt, and
   d) a cooling arrangement for the glass melt is situated inside the constriction.

2. The melting device of claim 1, wherein the cooling arrangement is situated in the constriction in height-adjustable fashion.

3. The melting device of claim 2, wherein the cooling arrangement is made up of pipe segments whose axes are situated in meander-shaped fashion in a common vertical plane.

4. The melting device of claim 1, wherein agitating elements are situated following the cooling arrangement, in the direction of flow.

5. The melting device of claim 1, wherein
   a) between the at least one loading opening and a first of the flue gas extraction openings, there are situated side burners for the heating and melting of the glass raw materials,
   b) between the first of the flue gas extraction openings and a second of the flue gas extraction openings, there are situated further side burners for the completion of the melting, and
   c) the refining region is kept free of burners.

6. The melting device of claim 1, wherein in the conditioning region, flue gas extraction openings and burners are arranged in such a sequence that the flue gases flow in the direction opposite to a surface flow of the glass melt.

7. The melting device of claim 1, wherein the floor surfaces are delimited from one another by a step formation fashioned so as to rise in the direction toward the overflow.

8. The melting device of claim 7, wherein a height of each step is between 5 and 30 cm.

9. The melting device of claim 1, wherein the height difference of the floor surfaces preceding and following the refining bench is between 10 and 30 cm.

10. The melting device of claim 1, wherein the defined melt surface level above the refining bench is between 0.2 and 0.5 m.

11. The melting device of claim 1, wherein the length of the refining bench in the direction of the sum flow of the glass melt is between 0.8 and 3.0 m.

12. The melting device of claim 1, wherein the length of the refining bench in the direction of the sum flow of the glass melt is between 1.0 and 2.5 m.

13. The melting device of claim 1, wherein widths of the melting region and the refining region are between 6.0 and 10.0 m.

14. The melting device of claim 1, wherein an inner width ratio of the refining region to the constriction is between 0.4 and 0.6.

15. The melting device of claim 1, wherein at least one preheating device for preheating oxidants for combustion of fuels is connected preceding the melting region.

16. The melting device of claim 15, wherein the at least one preheating device is made up of a regenerator block.

17. The melting device of claim 1, wherein the melting device is fashioned as a cross-flame oven, and a respective regenerator block is situated at both sides of the melting region, each such block being connected via burner ports to the chamber above the glass melt, and under-port burners are situated under the burner ports and above the surface of the glass melt.

* * * * *